(12) United States Patent
Uehara et al.

(10) Patent No.: US 7,089,277 B2
(45) Date of Patent: Aug. 8, 2006

(54) COMPUTATION CIRCUIT HAVING DYNAMIC RANGE EXTENSION FUNCTION

(75) Inventors: Teruaki Uehara, Tokyo (JP); Keitaro Ishida, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 697 days.

(21) Appl. No.: 10/367,691

(22) Filed: Feb. 19, 2003

(65) Prior Publication Data

US 2003/0229660 A1 Dec. 11, 2003

(30) Foreign Application Priority Data

Jun. 6, 2002 (JP) ............................. 2002-166018

(51) Int. Cl.
*G06F 7/499* (2006.01)

(52) U.S. Cl. ................................. 708/552
(58) Field of Classification Search .............. 708/552, 708/498
See application file for complete search history.

(56) References Cited

U.S. PATENT DOCUMENTS 4,379,338 A * 4/1983 Nishitani et al. .......... 708/552
4,700,324 A * 10/1987 Doi et al. ................... 708/552
5,047,975 A * 9/1991 Patti et al. .................. 708/706
5,319,588 A * 6/1994 Haines et al. .............. 708/552
6,243,731 B1 * 6/2001 Tessarolo .................... 708/498
7,013,321 B1 * 3/2006 Saulsbury ................... 708/523

FOREIGN PATENT DOCUMENTS

JP 2000-35875 2/2000

* cited by examiner

*Primary Examiner*—D. H. Malzahn
(74) *Attorney, Agent, or Firm*—Rabin & Berdo

(57) ABSTRACT

A computation circuit which can obtain n+m-digit accumulation results by using an n-digit computation unit. This computation circuit comprises a computation unit which performs additions of n-digit data; an m-digit up/down counter; and a control circuit which uses the up/down counter to generate the upper m digits of the computation result. In a preferred embodiment, the control circuit increments by one the up/down counter when carry-over occurs in the computation unit, and when the input data of the computation unit is negative, decrements by one the up/down counter. In another preferred embodiment, the control circuit increments or decrements by one the up/down counter when positive or negative overflow occurs in the computation unit, and decrements by one the up/down counter when the final computation result of the computation unit is negative or is a positive number greater than $2^{n-1}-1$.

20 Claims, 12 Drawing Sheets

FIG.3A

|     | C | D-MSB | CNT |
|-----|---|-------|-----|
| I   | 0 | 0     | ±0  |
| II  | 0 | 1     | −1  |
| III | 1 | 0     | +1  |
| IV  | 1 | 1     | ±0  |

FIG.3B

| Overflow | Before Computation | | | After Computation | |
|---|---|---|---|---|---|
| | CNT | T | $D_n$ | CNT | T |
| Negative | 0000 0000 | 1000 0000 0000 0000 | 1111 1111 1111 1111 | 1111 1111 | 0111 1111 1111 1111 |
| Positive | 0000 0000 | 0111 1111 1111 1111 | 0000 0000 0000 0001 | 0000 0001 | 1000 0000 0000 0000 |

*FIG.6A*

|  | C | D-MSB | CNT |
|---|---|---|---|
| I | 0 | 0 | ±0 |
| II | 0 | 1 | ±0 |
| III | 1 | 0 | −1 |
| IV | 1 | 1 | +1 |

*FIG.6B*

| T-MSB | CNT Correction |
|---|---|
| 0 | ±0 |
| 1 | −1 |

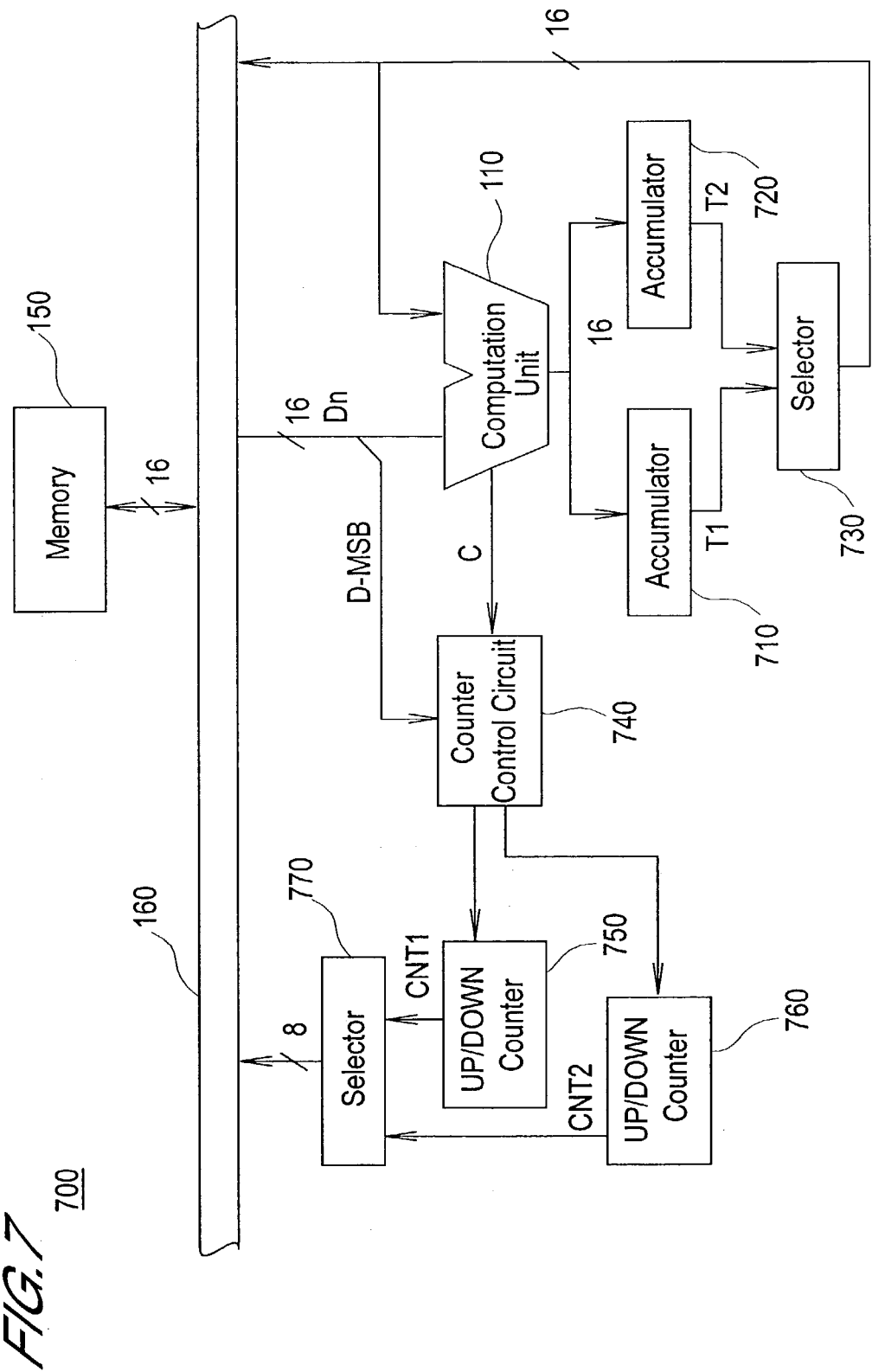

COMPUTATION CIRCUIT HAVING DYNAMIC RANGE EXTENSION FUNCTION

BACKGROUND OF THE INVENTION

1. Field of the Invention

This invention relates to a computation circuit such as, for example, a semiconductor processor. More specifically, this invention relates to a technique for extending the dynamic range of a computation circuit.

2. Description of the Related Art

Computation circuits include, for example, semiconductor processors. And, DSPs (digital signal processors), for example, are known as types of semiconductor processors. In general, computation circuits use computation units, data buses, memory and similar to perform data computation. When computations are performed, data is sent from memory to the computation unit via a data bus; and, computation results are sent to the memory or elsewhere via a data bus.

Many computation circuits comprise functions to perform accumulation. Accumulation is computation of the sum of numerous data items. When accumulation is performed, the computation unit reads one data item at a time from memory via a data bus, and adds the data items in succession. Accumulation processes are adopted in a controlled algorithm used in, for example, state evaluators and Kalman filters.

When performing accumulation, computation circuit overflow may occur. Overflow is the increase of the bit width of the computation result beyond the dynamic range. For example, when the dynamic range of a computation circuit is 16 bits, the values that can be processed by this circuit are from "$2^{15}-1$" to "$-2^{15}$". Hence when the computation result is larger than the maximum positive value "$2^{15}-1$" or smaller than the maximum negative number "$-2^{15}$", overflow occurs.

In order to suppress the occurrence of overflow, some method may be used to extend the dynamic range. In Japanese Patent Laid-open No. 2000-35875, a technique is disclosed for extending the dynamic range without extending the bit width of the computation unit, data bus or similar. By means of this technique, an up/down counter is used as an overflow counter. This up/down counter is counted up when a positive overflow of computation results occurs, and is counted down when a negative overflow of computation results occurs. And, when all computations are completed, if the overflow counter value is positive, the computation circuit outputs the maximum positive value as the computation result. On the other hand, if the value of the overflow counter is negative when all computations are completed, the computation circuit outputs the maximum negative value as the computation result. Extension of the dynamic range without extending the bit width of the computation unit, data bus or similar is extremely useful. This is because if the bit width of the computation unit, data bus or similar is extended, the instructions and codes used by the computation circuit must all be modified.

As described above, the device of Japanese Patent Laid-open No. 2000-35875 outputs the maximum positive value or the maximum negative value of the computation unit when an overflow occurs in the final result of accumulation. However, when there is an overflow in the computation result, the accurate computation result cannot be obtained. Hence The count value of the overflow counter cannot be adopted without modification as the upper bit, that is, the extended bit. This is because when there is an overflow of the computation result, the count value of the overflow counter does not necessarily accurately represent the upper bit of the computation result.

In addition, the device of Japanese Patent Laid-open No. 2000-35875 does not take into consideration cases in which a plurality of independent accumulations are executed in parallel. For example, when performing accumulation of complex numbers, there is a need to perform accumulation of real numbers and accumulation of imaginary numbers in alternation.

SUMMARY OF THE INVENTION

An object of this invention is to provide a computation circuit the dynamic range of which is extended at low cost and without increasing the circuit scale, the computation results of which are accurate, and with fast computation speed.

To this end, a computation circuit of this invention comprises an accumulator which stores an n-digit computation result; a computation unit which computes the sum of n-digit input data and the value stored in the accumulator, and stores the computation result in the accumulator; an m-digit up/down counter which increases and decreases a count value; and a control circuit which controls the count value of the up/down counter so as to coincide with the value of the upper m digits of the sum of the input data and the stored value.

By means of this invention, the up/down counter is controlled such that the count value is equal to the value of the upper m digits of the sum of input data and the stored value, so that an accurate n+m computation result is obtained.

BRIEF DESCRIPTION OF THE DRAWINGS

Other objects and advantages of this invention are explained referring to the following attached drawings.

FIG. 3A and FIG. 3B are tables to explain the operation of the computation circuit of the first aspect;

FIG. 6A and FIG. 6B are tables to explain the operation of the computation circuit of the second aspect;

FIG. 7 is a block diagram showing the configuration of the computation circuit of the third aspect;

DESCRIPTION OF THE PREFERRED EMBODIMENTS

Figure 1:
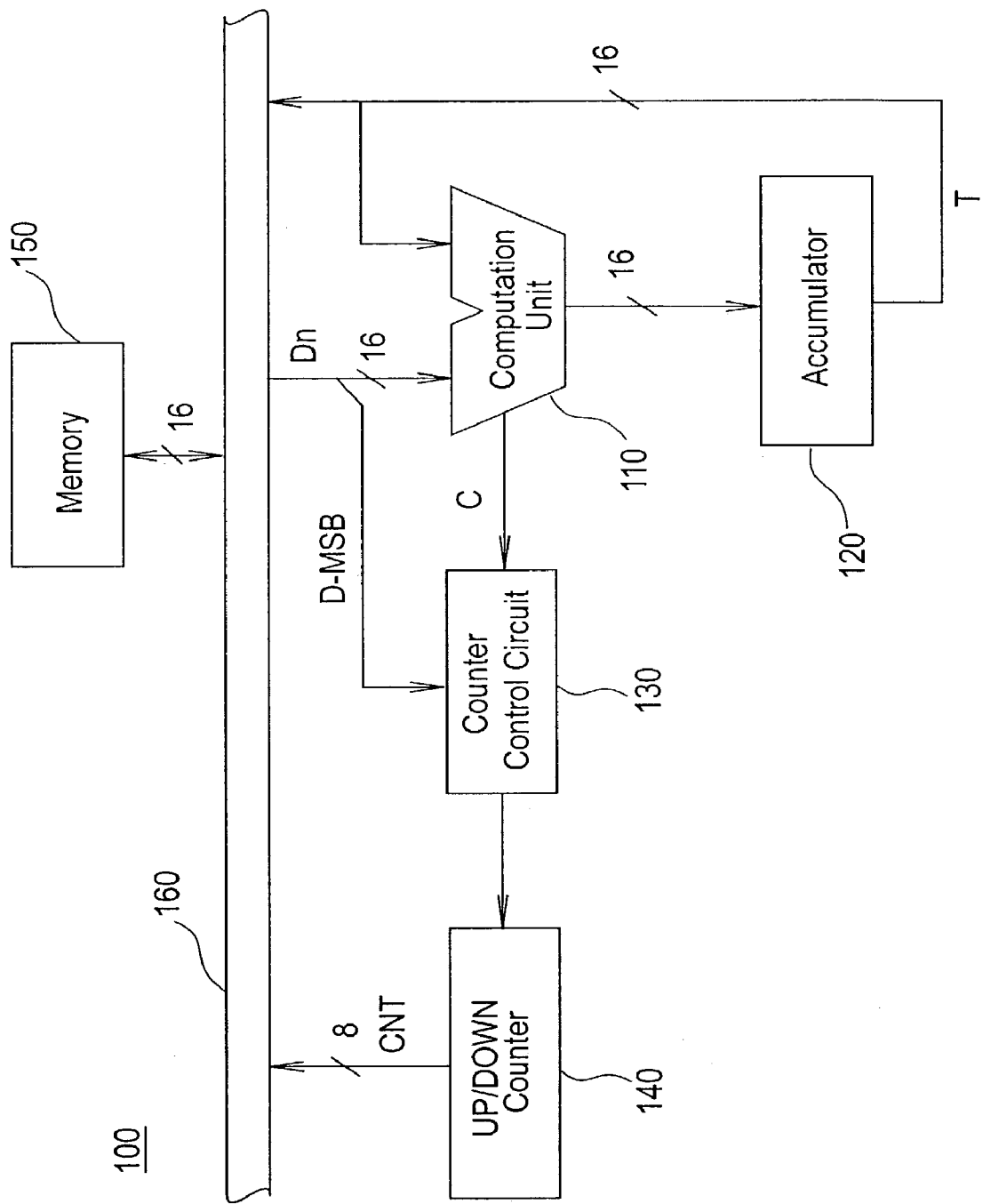
FIG. 1 is a block diagram showing the configuration of the computation circuit of a first aspect.

Below, aspects of the invention are explained using the drawings. In the drawings, the size, shape, and positional relation of each component part are only shown in approximation to a degree sufficient to enable understanding of the invention; moreover, numerical conditions explained below are no more than examples.

First Embodiment

Below, a first aspect of the invention is explained, using FIG. 1 through FIG. 3B.

This aspect is explained adopting as an example a case in which the dynamic range is to be extended from 16 bits to 24 bits.

FIG. 1 is a block diagram showing the configuration of the computation circuit of this aspect.

As shown in FIG. 1, this computation circuit 100 comprises a computation unit 110, accumulator 120, counter control circuit 130, up/down counter 140, memory 150, and data bus 160.

The computation unit 110 computes the sum of data input from one input terminal and the data input from the other input terminal. One of the input terminals of the computation unit 110 is connected to the data bus 160. The other input terminal of the computation unit 110 is connected to the output terminal of the accumulator 120. In addition, the computation unit 110 outputs a carry signal C when carry-over of the computation result occurs. As a computation unit 110, for example, a general ALU (arithmetic logic unit) can be used. In this aspect, the bit width of the computation unit 110 is taken to be 16 bits.

The accumulator 120 is a register used to temporally store the computation result output from the computation unit 110. The accumulator 120 outputs a storage value T to the computation unit 110 or to the data bus 160. In this aspect, the bit width of the accumulator 120 is taken to be 16 bits.

The counter control circuit 130 takes as input the highest bit (that is, the sign bit) D-MSB of the data Dn input to the computation unit 110, and also takes as input a carry signal C generated by the computation unit 110. The counter control circuit 130 controls the operation of the up/down counter 140 according to the values of these signals. Details of control by the counter control circuit 130 are explained below.

The up/down counter 140 raises or lowers the count value CNT according to control by the counter control circuit 130. Also, after the end of accumulation, the up/down counter 140 outputs the count value CNT to the bus 160. In this aspect, the bit width of the up/down counter 140 is taken to be 8 bits.

The memory 150 stores numerous data items Dn (D1, D2, ... ) used in accumulation. In addition, the memory 150 can store the results of accumulation. As the memory 150, for example, volatile semiconductor memory is used. In this aspect, the bit width of each data item Dn stored in the memory 150 is taken to be 16 bits. In the computation circuit 100 of this aspect, 2's complement is adopted as the method of data representation. Hence the most significant bit of each data item Dn, that is, the signal D-MSB, is a sign bit.

The data bus 160 is connected to the circuits 110 to 150. The data bus 160 can also be connected to other circuits, not shown. In this aspect, the bit width of the data bus is taken to be 16 bits.

Figure 2A:
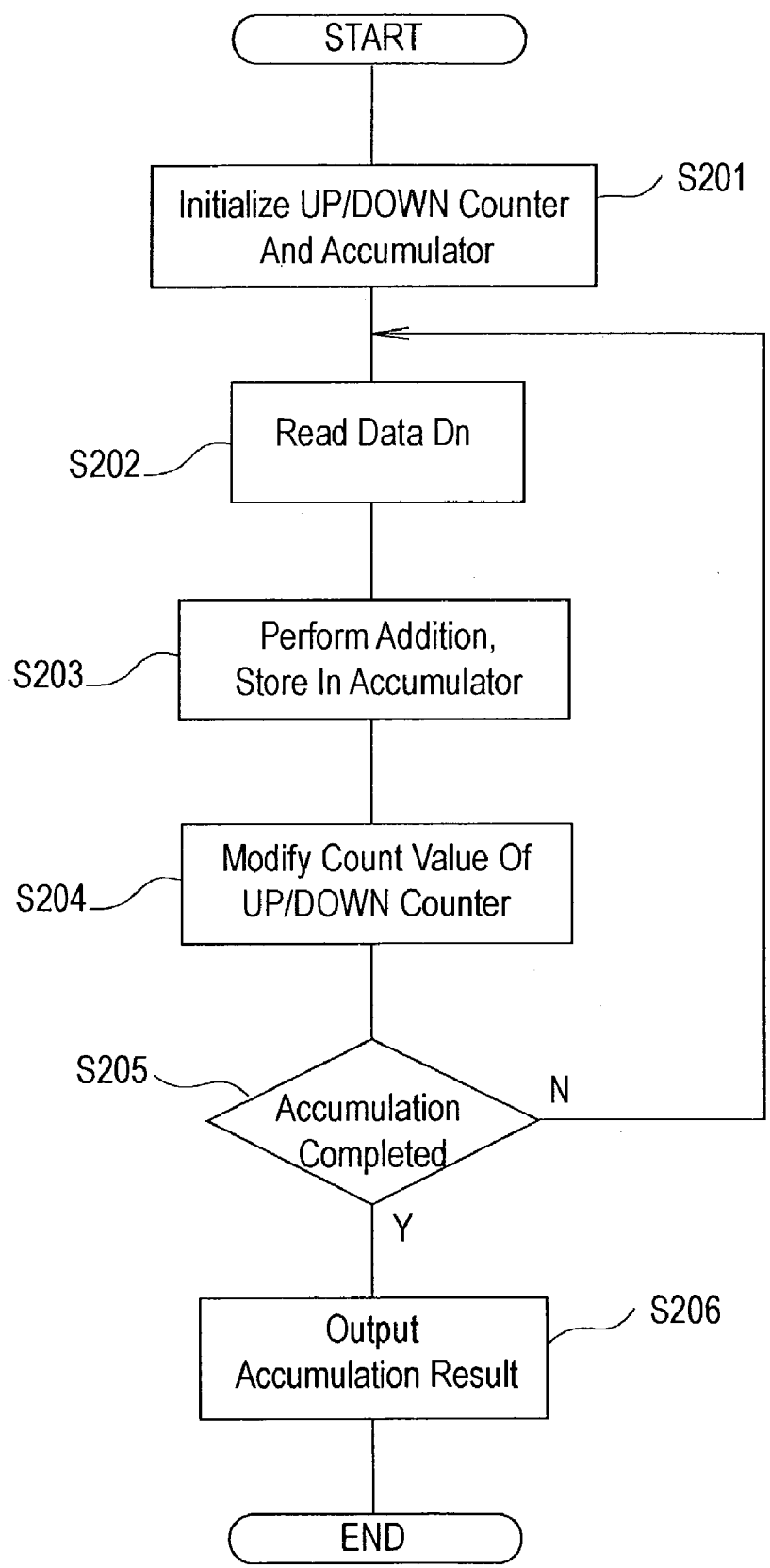
FIG. 2A is a flowchart showing the operation of the computation circuit of the first aspect.
Figure 2B:
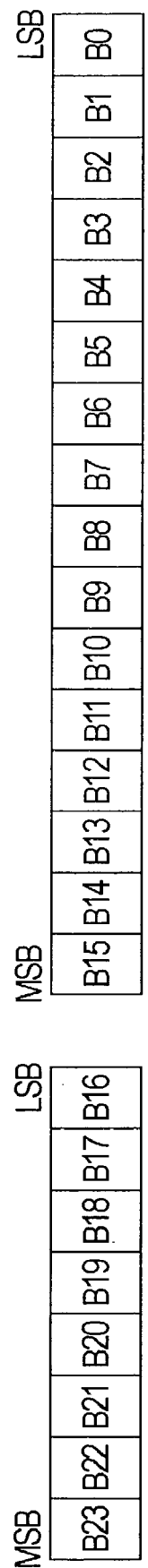
FIG. 2B is a conceptual diagram showing the data structure of the computation circuit of first through fourth aspects.

Next, operation of the computation circuit 100 shown in FIG. 1 is explained. FIG. 2A is a flowchart showing in summary the operation of the computation circuit 100 of the first aspect. FIG. 2B is a conceptual diagram showing the bit structure of accumulation result data.

As shown in FIG. 2B, the result of accumulation is expressed by 24 bits of data B0 through B23. The computation result of the computation unit 110, that is, bits B0 to B15, indicate the lower 16 bits of the accumulation result. The count value CNT of the up/down counter 140, that is, B16 through B23, indicate the upper 8 bits of the computation result.

First, the computation circuit 100 is initialized (see step S201 in FIG. 2A). In this initialization processing, the count value CNT of the up/down counter 140 is reset to zero, and the stored value T of the accumulator 120 is reset to zero.

Next, the first data item Dn (that is, D1) is read from the memory 150 (see step S202). The read data item Dn is input to one of the input terminals of the computation unit 110 via the data bus 160. The stored value T of the accumulator 120 is input to the other input terminal of the computation unit 110.

The computation unit 110 computes the sum of the two input data items Dn and T (see step S203). In the first calculation, the stored value of the accumulator 120 is reset to zero, and so the output value of the computation unit 110 is the same value as the data item D1 read from the memory 150. The stored value T of the accumulator 120 is rewritten to the output value of the computation unit 110 (see step S203).

As explained above, the most significant bit D-MSB of the data item Dn is input to the counter control circuit 130 as well as to the computation unit 110. Also, when carry-over of the computation result occurs (that is, when there is carry-over from bit B15 to bit B16), the computation unit 110 sends a carry signal C to the counter control circuit 130.

The counter control circuit 130 controls the up/down counter 140 according to the values of the signals D-MSB and C (see step S204). Details of control by the counter control circuit 130 are explained below.

Next, a check is performed to determine whether computations are completed for all data items Dn (see step S205). If there remains a data item Dn which has not been added, step S202 and subsequent processing is repeated. On the other hand, if it is judged that all data items Dn have been added, the accumulation result is output to the data bus 160 (see step S206). After the end of computations, the stored value T is the lower 16 bits of the computation result, and the count value CNT is the upper 8 bits of the computation result. The most significant bit B23 of the count value CNT is a sign bit. These values T and CNT are stored, for example, in the memory 150 via the data bus 160.

Figure 3A:
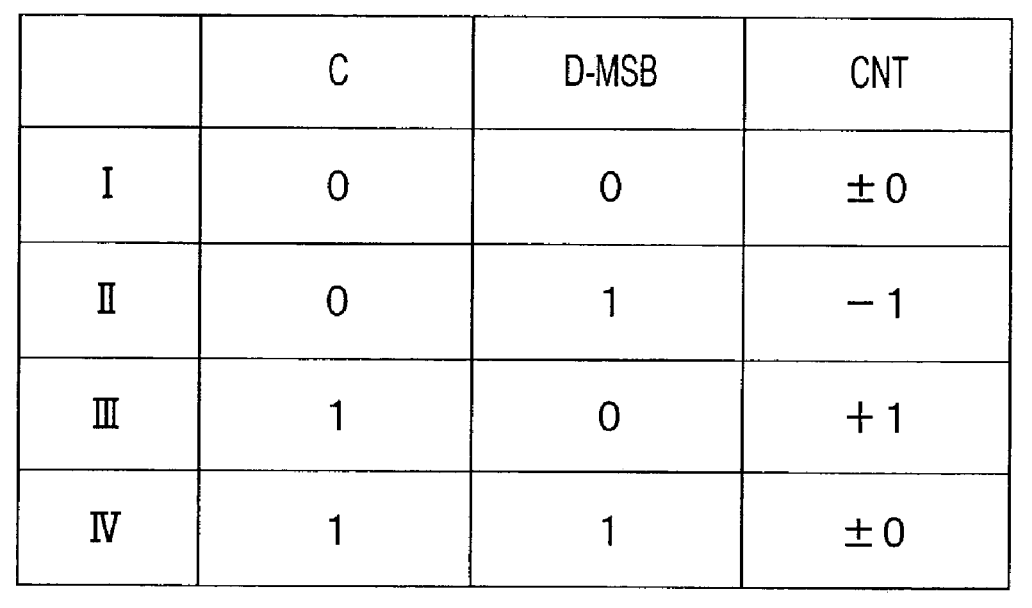

FIG. 3A indicates the details of operation of the counter control circuit 130, that is, of step S204 in FIG. 2.

The value of the carry signal C is "1" when a carry-over occurs, and is "0" when a carry-over does not occur. The sign bit D-MSB is "0" when the data item Dn is positive, and is "1" when the data item Dn is negative. In the counter operation column, "+1" signifies that the count value CNT is incremented by one, "−1" signifies that the count value CNT is decremented by one, and "±0" signifies that the count value CNT is not changed.

As explained above, in this aspect when accumulation is completed, the stored value T (that is, B0 to B15) of the accumulator 120 is the lower 16 bits of the computation result, and the count value CNT (that is, B16 to B23) of the up/down counter 140 is the upper 8 bits of the computation result. Hence in this aspect, the operation of the up/down counter 140 is controlled so as to coincide with changes in the upper 8 bits when 24-bit data is added in succession.

When the most significant bit D-MSB of the data item Dn is "0", the data item Dn is a positive number. When converting positive 16-bit data into 24-bit data, "00000000" is concatenated as the upper 8 bits. Hence when there is no carry-over, "00000000" is added to the count value CNT of the up/down counter 140. In other words, the count value CNT is not changed (see row I in FIG. 3A). On the other hand, when a carry-over of the most significant bit B15 of the computation unit 110 occurs, "00000001" is added to the count value CNT, and so the count value CNT is incremented by one (see row III in FIG. 3A).

When the most significant bit D-MSB of the data item Dn is "1", the data item Dn is a negative number. In order to convert negative 16-bit data into 24-bit data, "11111111" is concatenated as the upper 8 bits. Hence "11111111" is added to the count value CNT of the up/down counter 140. In the up/down counter 140, the computation result is the same when adding "11111111" and when subtracting "00000001". In other words, when there is no carry-over, the count value CNT of the up/down counter 140 is reduced by "1" (see row II in FIG. 3A). On the other hand, when a carry-over of the most significant bit of the computation unit 110 occurs, "00000001" must be further added to the sum of the count value CNT and "11111111". Hence the change in the count value CNT is ultimately zero (see row IV in FIG. 3A).

For comparison, the case in which the count value CNT of the up/down counter 140 is controlled according to overflow is explained using FIG. 3B. In FIG. 3B, binary numbers are used, but in the explanation of this specification, hexadecimal representation is employed.

The upper row in FIG. 3B is an example of a case in which negative overflow occurs. In this example, prior to computation the count value CNT is "0", and the stored value T is "8000". In this aspect, 2's complement is employed as the method of negative number representation, and the sign bit DMSB for a negative number is "1", so that "8000" is the maximum value of T. When the data item Dn, that is, "−1", is added to this maximum negative number, negative overflow occurs. In this case, when the count value CNT is decremented by one, the computation result becomes "8001". This computation result is accurate.

The lower row in FIG. 3B is an example of the occurrence of positive overflow. In this example, prior to computation the count value CNT of the up/down counter 140 is "0", and the stored value T of the accumulator 120 is "7FFF". For the data used in this aspect, the most significant bit is a sign bit, and the other 15 bits represent the absolute value of the data. Hence "7FFF" is the maximum positive value. Therefore when data item Dn, that is, "1", is added to the stored value T, positive overflow occurs. The addition result T is "8000". Here if there is an increment by one in the count value CNT, the computation result represented by the data CNT and T is "18000"; this computation result is not accurate.

The computation circuit 100 of this aspect increases or decreases the count value CNT of the up/down counter 140 according to changes in the value of the upper 8 bits of the 24-bit data, rather than according to overflow occurrence. Hence by means of the computation circuit 100, an accurate 24-bit computation result can be obtained. Therefore by means of this aspect, the dynamic range can be extended without detracting from the accuracy of the computation result.

As shown in FIG. 3A, control by the counter control circuit 130 is extremely simple. Hence there is extremely little increase in the scale of the circuit accompanying the application of this aspect.

Second Embodiment

Next, FIGS. 4 through 6B are used to explain a second aspect of the invention.

This aspect is explained using as an example a case in which, like the first aspect, the dynamic range is extended from 16 bits to 24 bits.

Figure 4:
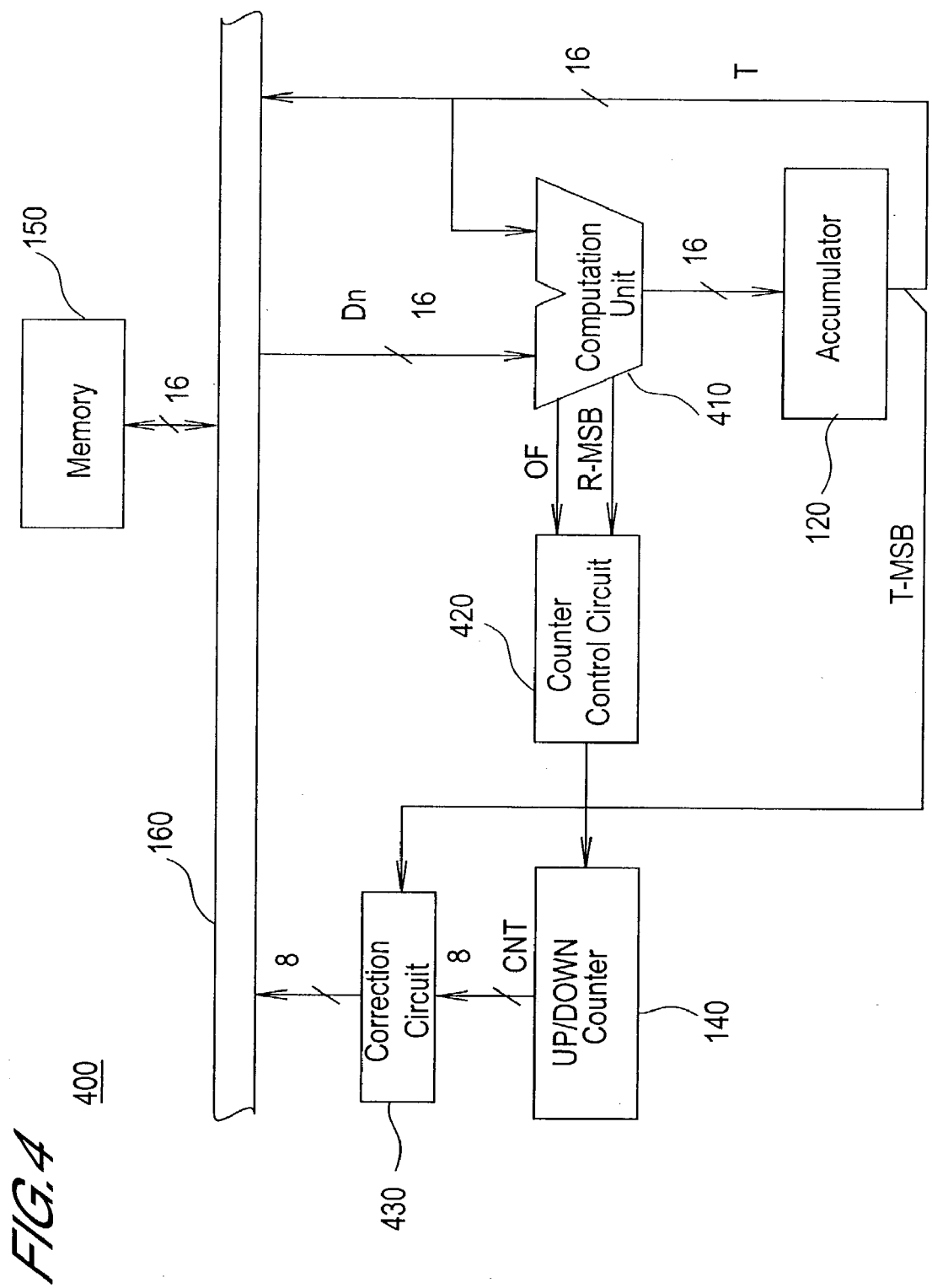
FIG. 4 is a block diagram showing the configuration of the computation circuit of the second aspect.

FIG. 4 is a block diagram showing the configuration of the computation circuit of this aspect.

In FIG. 4, components to which are assigned the same symbols as in FIG. 1 are the same as in FIG. 1.

The computation unit 410 computes the sum of data input from two input terminals. In the computation unit 410, one of the input terminals is connected to the data bus 160, and the other input terminal is connected to the output terminal of the accumulator 120. The computation unit 410 outputs an overflow signal OF when an overflow occurs in the computation result. Also, the computation unit 410 outputs the R-MSB bit of the computation result (that is, bit B15 in FIG. 2B). As the computation unit 410, for example, an ordinary ALU (arithmetic logic unit) can be used. In this aspect, the bit width of the computation unit 110 is taken to be 16 bits.

The counter control circuit 420 inputs the overflow signal OF and sign bit R-MSB from the computation unit 410. Then, according to the values of the signals OF and R-MSB, the counter control circuit 420 controls operation of the up/down counter 140. Details of this control are explained below.

The correction circuit 430 takes as input the most significant bit T-MSB (that is, the sign bit) of the data item T stored in the accumulator 120. And, the correction circuit corrects the count value CNT of the up/down counter 140 based on the value of the signal T-MSB. Details of the correction are explained below.

Figure 5:
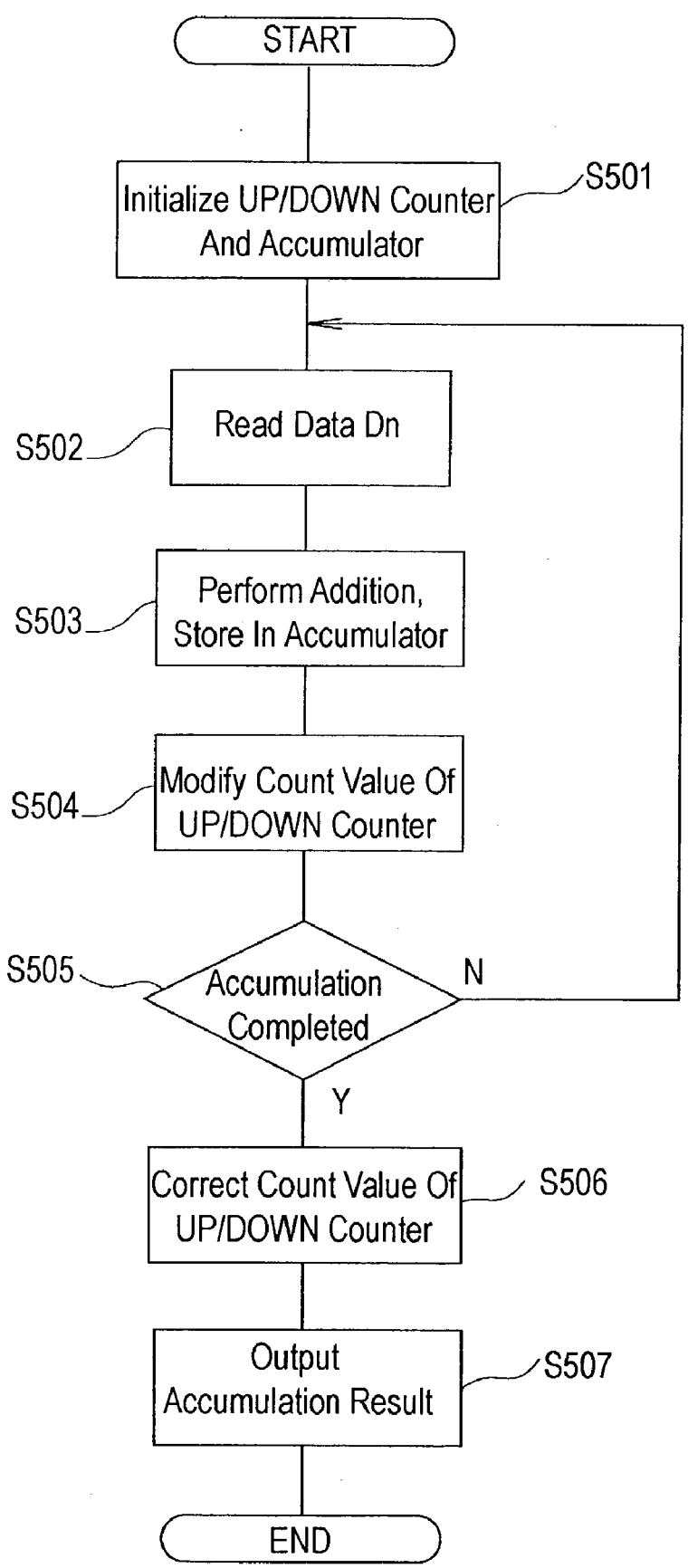
FIG. 5 is a flowchart showing the operation of the computation circuit of the second aspect.

Next, the operation of the computation circuit 400 shown in FIG. 4 is explained, using the flowchart of FIG. 5.

First, the computation circuit 400 is initialized (see step S501). In this initialization processing, the count value CNT of the up/down counter 140 is reset to zero, and the stored value T of the accumulator 120 is reset to zero.

Next, the first data item Dn (that is, D1) is read from the memory 150 (see step. S502). The read data item Dn is input to one input terminal of the computation unit 410 via the data bus 160. The stored value T of the accumulator 120 is input to the other input terminal of the computation unit 410.

The computation unit 410 computes the sum of the two input data items D1 and T (see step S503). During the first computation, the stored value of the accumulator 120 is reset to zero, and so the output value of the computation unit 410 is the same as the data item Dl read from the memory 150. The stored value T of the accumulator 120 is rewritten to the output value of the computation unit 410 (see step S503).

The computation unit 410 sends the sign bit R-MSB of the computation result to the counter control circuit 420. Also, when overflow of the computation result occurs, the computation unit 410 sends an overflow signal OF to the counter control circuit 420.

The counter control circuit 420 controls the up/down counter 140 according to the values of the signals OF and RMSB (see step S504). Details of control by the counter control circuit 420 are explained below.

Next, a check is performed to determine whether computations have been completed for all data items Dn (see step S505). If there remains a data item Dn which has not been added, step S502 and subsequent processing is repeated. On the other hand, if it is judged that all data items Dn have been added, the count value CNT of the up/down counter 140 is corrected by the correction circuit 430 (see step S506). Details of correction by the correction circuit 430 are explained below. Then, the data T and the corrected count value CNT are, for example, stored in the memory 150 via the data bus 160 (see step S507).

FIG. 6A shows the details of operation of the counter control circuit 420, that is, of step S504 in FIG. 5.

In this aspect, the count value CNT of the up/down counter 140 is incremented by one when a positive overflow occurs, and the count value CNT is decremented by one when a negative overflow occurs.

The value of the overflow signal OF is "1" when an overflow occurs, and is "0" when an overflow does not occur. As described above, R-MSB is the value of the most significant bit of the computation unit, that is, bit B15, the sixteenth bit (see FIG. 2B). Also, "+1" signifies that the count value is incremented by one, "−1" signifies that the count value is decremented by one, and "±0" signifies that the count value is not changed.

Rows I and II in FIG. 6A correspond to cases in which overflow does not occur. When overflow does not occur, the count value CNT of the up/down counter 140 does not change, regardless of the value of the signal R-MSB.

Row III corresponds to a case in which negative overflow occurs. Negative overflow occurs only when the data item Dn and the data T prior to computation are both negative. When overflow occurs upon addition of a negative number and a negative number, the 16th bit of the computation result, that is, R-MSB, is "0". Hence the conditions OF=1 and moreover R-MSB=0 indicate that negative overflow has occurred. At this time, the counter control circuit 420 decrements by one the count value CNT of the up/down counter 140.

Row IV corresponds to a case in which positive overflow occurs. Positive overflow occurs only when the data item Dn and the data T prior to computation are both positive. When overflow occurs upon addition of a positive number and a positive number, the 16th bit of the computation result, that is, R-MSB, is "1". Hence the conditions OF=1 and moreover R-MSB=1 indicate that positive overflow has occurred. At this time, the counter control circuit 420 increments by one the count value CNT of the up/down counter 140.

FIG. 6B shows the details of operation of the correction circuit 430, that is, of step S506 in FIG. 5.

As explained above (see FIG. 3B), the overflow value need not necessarily coincide with the upper 8 bits of the accumulation result. Therefore in this aspect, after the end of accumulation, the correction circuit 430 corrects the count value CNT of the up/down counter 140. The correction circuit 430 first reads the sign bit T-MSB of the stored value T. Then, if T-MSB is "0", the count value CNT is not corrected, and if the sign bit T-MSB is "1", "−1" is added to the count value CNT.

As explained above, the data Dn is represented using 2's complement method. Hence the most significant bit of the data Dn is a sign bit. In other words, the most significant bit of the data Dn is not a data bit (that is, a bit representing a data value). However, computations by the computation unit 410 are executed without distinguishing between sign bits and data bits.

(1) First, the case in which a positive overflow occurs is explained.

Positive overflow means that the most significant bit B15 (see FIG. 2B) of the computation result becomes "1" when computing the sum of data items the most significant bits of which are both "0". When a carry-over from bit B14 to the most significant bit B15 occurs on computing the sum of two positive numbers, the bit B15 of the computation result becomes "1". This is positive overflow. When positive overflow occurs, carry-over (that is, carry-over from bit B15 to bit B16) of the computation unit 410 does not occur. When positive overflow occurs for the first time after the start of accumulation, despite the fact that carry-over of the computation unit 410 does not occur, the count value CNT of the up/down counter 140 is incremented by one. Hence the count value CNT becomes larger than the accurate value by "1" (see FIG. 3). Bit B15 at this time does not coincide with the sign, but does coincide with the computation result.

Thereafter, by adding one positive number or a plurality of positive numbers in succession, the computation result of the computation unit 410 may exceed "1111111111111111" (that is, the state in which bits B0 to B15 are all "1"). In this case, carry-over of the computation result of the computation unit 410 (that is, carry-over from bit B15 to bit B16) occurs, but overflow does not occur. Overflow does not occur in the counter control circuit 420, so that the count value CNT of the up/down counter 140 is not increased. Hence the count value CNT accurately coincides with the upper 8 bits B16 to B23 of the computation result. When carry-over occurs due to addition of positive numbers, the most significant bit B15 of the computation unit 410 is always "0".

When, by the addition of one positive number or a plurality of positive numbers in succession, the most significant bit B15 again becomes "1", an overflow signal is output from the computation unit 410. Consequently, the count value CNT becomes larger by "1" than the accurate value.

As a result, when positive overflow occurs one or more times, if bit B15 is "1" the count value CNT becomes larger than the accurate value by "1", and if bit B15 is "0" the count value CNT coincides with the accurate value. In other words, if the computation result of the computation unit 410 is $2^{15}$ or greater, the count value CNT is greater than the accurate value by "1", and if the computation result is smaller than $2^{15}$, the count value CNT coincides with the accurate value. If positive overflow has occurred one or more times, this rule always obtains, regardless of the number of times of occurrence.

(2) Next, the case in which negative overflow occurs is explained.

Negative overflow means that the most significant bit B15 (see FIG. 2B) of the computation result becomes "0" when computing the sum of data items the most significant bits of which are both "1". The most significant bit of a negative number is "1". Hence negative overflow occurs when bit B15 of the computation result is "0", and moreover a carry-over from bit B15 to bit B16 occurs. Consequently when negative overflow occurs, carry-over always necessarily occurs. As explained in the first aspect, when carry-over occurs upon adding a negative data item Dn, if "1" is subtracted from the count value CNT, the count value CNT accurately coincides with the upper 8 bits B16 to B23 of the computation result. Hence when negative overflow occurs, the count value CNT of the up/down counter 140 coincides with the accurate value.

(3) Next, the case in which accumulation ends without the occurrence of overflow, and moreover the final accumulation result is a positive number, is explained.

When the final accumulation result is a positive number, if overflow does not occur, carry-over also does not occur. Hence in this case the count value CNT is "00000000". This value CNT coincides with the upper 8 bits of the accumulation result. Also, if overflow does not occur even once, bit B15 of the computation result is "0".

(4) Next, the case in which accumulation ends without the occurrence of overflow, and moreover the final accumulation result is a negative number, is explained.

When the final accumulation result is a negative number, if overflow does not occur, carry-over need not be considered. That is, even if carry-over is ignored, the computation result of the computation unit 410, that is, bits B0 to B15, is accurate. However, when accumulation ends, the count value CNT of the up/down counter 140 is "00000000". Hence similarly to the first aspect, in order to convert the computation result to 24 bits, the count value CNT must be changed to "11111111". In other words, the count value CNT after the end of computation is larger by "1" than the accurate value.

From the above (1) and (4), it is seen that, if after the end of accumulation the bit B15 is "1", the count value CNT of the up/down counter 140 must be decremented by "1". And from the above (1), (2) and (3), it is seen that, if after the end of accumulation the bit B15 is "0", there is no need to correct the count value CNT of the up/down counter 140.

The computation circuit 400 of this aspect increases or decreases the count value CNT of the up/down counter 140 according to the occurrence of overflow. And, the count value CNT is corrected according to the value of the most significant bit of the stored value T of the accumulator. Hence by means of the computation circuit 400, an accurate 24-bit computation result can be obtained. Therefore by means of this aspect, the dynamic range can be extended without detracting from the accuracy of the computation result.

As shown in FIG. 6A and FIG. 6B, control of the counter control circuit 420 and the correction circuit 430 is extremely simple. Therefore the increase in circuit scale accompanying application of this aspect is extremely small.

Third Embodiment

Figure 8:
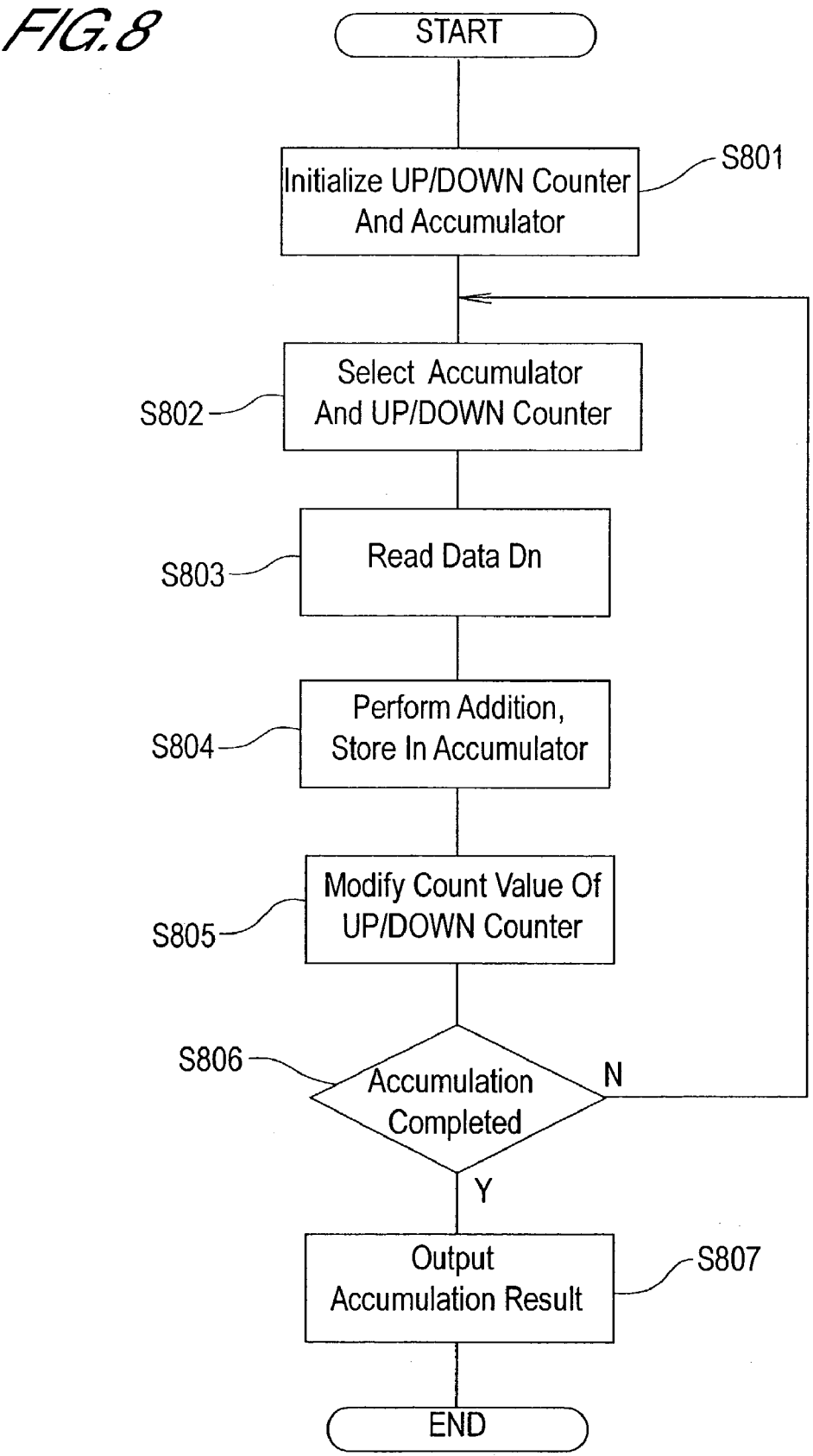
FIG. 8 is a flowchart showing the operation of the computation circuit of the third aspect.

Below a third aspect of the invention is explained, using FIG. 7 and FIG. 8. This aspect explains as an example a case in which the dynamic range is extended from 16 bits to 24 bits.

The computation circuit of this aspect is configured such that two kinds of accumulation are executed in parallel.

FIG. 7 is a block diagram showing the configuration of a computation circuit of this aspect.

In FIG. 7, components to which are assigned the same symbols as in FIG. 1 are the same as in FIG. 1.

The computation circuit 700 comprises two accumulators 710, 720. The accumulators 710, 720 are registers which temporarily store the computation results output from the computation unit 110. In this aspect, the bit widths of the accumulators 710 and 720 is 16 bits$^i$.

The selector 730 takes as input the stored values T1, T2 from the accumulators 710, 720, and selectively outputs these stored values to the computation unit 110 or to the data bus 160.

The counter control circuit 740 separately controls the counting up and down of two up/down counters 750, 760 according to the most significant bit D-MSB of the data Dn and the carry signal C of the computation unit 110.

The computation circuit 700 comprises two up/down counters 750, 760. The up/down counter 750 increases or decreases the count value CNT1 according to control by the counter control circuit 740. The up/down counter 760 increases or decreases the count value CNT2 according to control by the counter control circuit 740. The count values CNT1, CNT2 are output after completion of accumulation. In this aspect, the bit widths of the up/down counters 750, 760 are 8 bits.

The selector 770 takes as input the stored values CNT1, CNT2 of the up/down counters 750, 760, and selectively outputs these stored values to the bus 160.

Next, the operation of the computation circuit 700 shown in FIG. 7 is explained, taking as an example a case in which a accumulation of complex numbers is executed. FIG. 8 is a flowchart showing in summary the operation of the computation circuit 700.

First, the computation circuit 700 is initialized (see step S801). In this initialization processing, the count values CNT1, CNT2 of the up/down counters 750, 760 are reset to zero, and the stored values T1, T2 of the accumulators 710, 720 are reset to zero.

Next, the accumulator and up/down counter to be used in computations are selected (step S802). In this aspect, the accumulator 710 and up/down counter 750 are used in accumulation of real numbers, and the accumulator 720 and up/down counter 760 are used in accumulation of imaginary numbers. Hence when the selector 730 selects the accumulator 710, the counter control circuit 740 controls the up/down counter 750, and when the selector selects the accumulator 720, the counter control circuit 740 controls the up/down counter 760. In this aspect, as an example, a case is explained in which the accumulator 710 and up/down counter 750 are selected in the first computation processing.

In step S803, the first data Dn is read from the memory 150. The read data Dn is input to one of the input terminals of the computation unit 110 via the data bus 160. The stored value T1 of the accumulator 710 is input to the other input terminal of the computation unit 110.

The computation unit 110 executes computation of the sum of the input data items Dn and T1 (see step S804). This computation is the first real part computation. During the first computation, because the stored value of the accumulator 710 has been reset to zero, the output value of the computation unit 110 is equal to the data Dn read from the memory 150. The stored value T1 of the accumulator 710 is rewritten to the output value of the computation unit 110 (see step S804).

As described above, the most significant bit D-MSB of the data Dn is input to the counter control circuit 740 as well as to the computation unit 110. Also, when carry-over occurs in the computation result, the computation unit 110 sends a carry signal C to the counter control circuit 740.

The counter control circuit 740 controls the up/down counter 750 according to the values of the signals D-MSB and C (see step S805). Details of control by the counter control circuit 740 are similar to the control of the first aspect (see FIG. 3A).

Next, a check is performed to determine whether computations are completed for all data items Dn (see step S806). If there remains a data item Dn which has not been added, step S802 is repeated. In the second processing of step S802, the selections of the selectors 730 and 770 are switched; that is, the accumulator 720 and up/down counter 760 are selected.

Next, the second data item Dn is read from the memory 150 (see step S803). The read data Dn is input to one of the input terminals of the computation unit 110 via the data bus 160. The stored value T2 of the accumulator 720 is input to the other input terminal of the computation unit 110.

The computation unit 110 executes computation of the sum of the input data items Dn and T2 (see step S804). This computation is the first imaginary part computation. At this time, the stored value of the accumulator 720 is reset to zero, so that the output value of the computation unit 110 is the same value as the data Dn read from the memory 150. The stored value T2 of the accumulator 720 is rewritten to the output value of the computation unit 110 (see step S804).

The counter control circuit 740 controls the up/down counter 760 according to the values of the signals D-MSB and C (see step S805). Details of this control are similar to the control at the time of computation of the real part.

Accumulation of the real part and accumulation of the imaginary part are executed in alternation until, in step S806, it is judged that computation has been completed for all data items Dn.

When, in step S806, it is judged that all data items Dn have been added, the accumulation results, that is, the data items T1, T2, CNT1, and CNT2, are output to the data bus 160 (see step S807). After completion of computations, the stored value T1 is the lower 16 bits of the real part, and the count value CNT1 is the upper 8 bits of the real part. Also, the stored value T2 is the lower 16 bits of the imaginary part, and the count value CNT2 is the upper 8 bits of the imaginary part. The most significant bits of the count values CNT1, CNT2 are sign bits. These values T1, T2, CNT1, CNT2 are, for example, stored in the memory 150.

The computation circuit 700 of this aspect comprises two accumulators 710, 720 and two up/down counters 750, 760; hence, two kinds of accumulation can be executed in parallel at high speed. In a computation circuit in which are provided only one accumulator and one up/down counter, in order to execute two kinds of accumulation in parallel, computation results must be stored temporarily in memory or similar after each computation. Further, in such a computation circuit the computation results stored temporarily upon each computation must be read and stored in the accumulator and up/down counter. Hence the efficiency of computation processing is worsened, and so processing time is increased. In contrast, in the computation circuit 700 of this aspect, it is only necessary to switch the output of the selectors 730, 770, so that fast processing is possible.

For reasons similar to those for the computation circuit 100 of the first aspect, the dynamic range of the computation circuit 700 of this aspect can be extended without detracting from the accuracy of the computation results.

Fourth Embodiment

Below, a fourth aspect of this invention is explained, using FIG. 9 and FIG. 10. This aspect is explained adopting as an example a case in which the dynamic range is extended from 16 bits to 24 bits.

The computation circuit of this aspect is configured so as to enable parallel execution of two kinds of accumulation.

Figure 9:
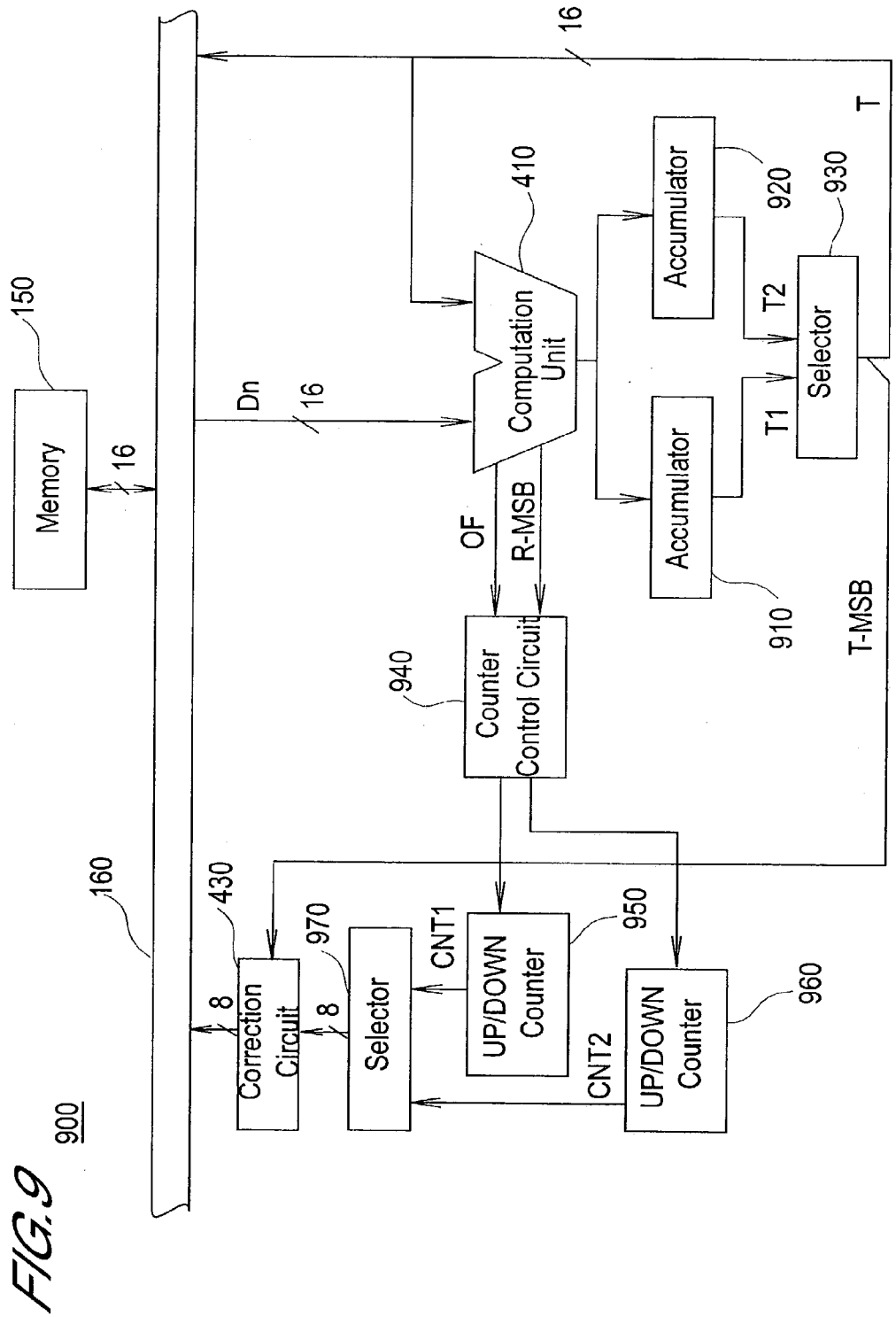
FIG. 9 is a block diagram showing the configuration of the computation circuit of the fourth aspect; and, FIG. 10 is a flowchart showing the operation of the computation circuit of the fourth aspect.
Figure 10:
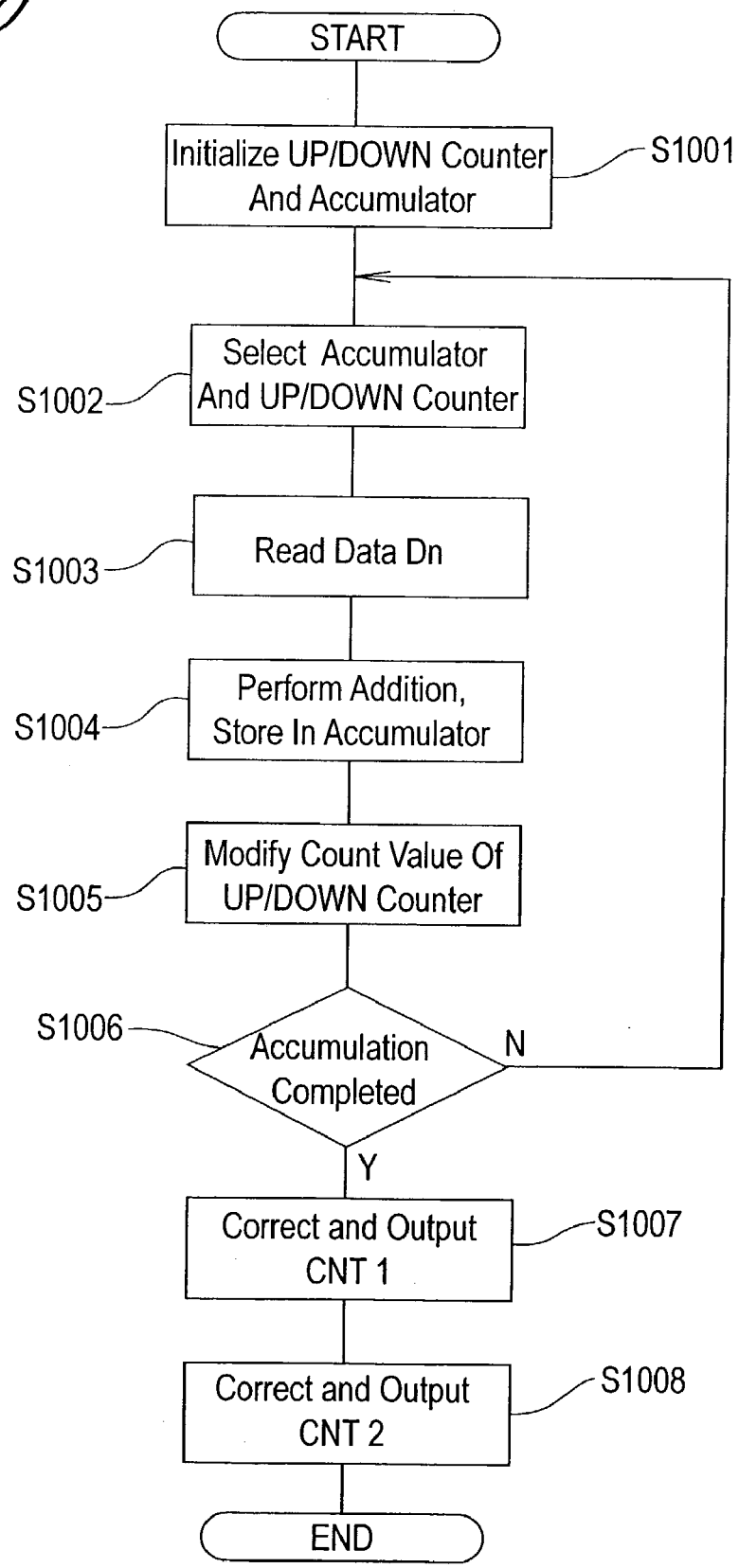

FIG. 9 is a block diagram showing the configuration of the computation circuit of this aspect.

In FIG. 9, components to which are assigned the same symbols as in FIG. 4 are the same as in FIG. 4.

The computation circuit 900 comprises two accumulators 910, 920. The accumulators 910, 920 are registers for temporarily storing computation results output from the computation unit 410. In this aspect, the bit widths of the accumulators 910, 920 are 16 bits.

The selector 930 takes as inputs the stored values T1, T2 from the accumulators 910, 920, and selectively outputs these stored values to the computation unit 410 or to the data bus 160.

The counter control circuit 940 individually controls counting up and counting down of the two up/down counters 950, 960 according to the most significant bit D-MSB of the data Dn and the carry signal C of the computation unit 410.

The computation circuit 900 comprises two up/down counters 950, 960. The up/down counter 950 increases or decreases the count value CNT1 according to control by the counter control circuit 940. The up/down counter 960 increases or decreases the count value CNT2 according to control by the counter control circuit 940. In this aspect, the bit widths of the up/down counters 950, 960 are 8 bits.

The selector 970 takes as input the stored values CNT1, CNT2 from the up/down counters 950, 960, and selectively outputs these stored values to the bus 160.

Next, operation of the computation circuit 900 shown in FIG. 9 is explained, taking as an example the case of execution of accumulation of complex numbers. FIG. 10 is a flowchart showing in summary the operation of the computation circuit 900.

First, the computation circuit 900 is initialized (see step S1001). In this initialization processing, the count values CNT1, CNT2 of the up/down counters 950, 960 are reset to zero, and the stored values T1, T2 of the accumulators 910, 920 are reset to zero.

Next, the accumulator and up/down counter to be used in computation are selected (step S1002). In this aspect, the accumulator 910 and up/down counter 950 are used in real part accumulation, and the accumulator 920 and up/down counter 960 are used in imaginary part computations. Hence when the selector 930 selects the accumulator 910, the counter control circuit 940 controls the up/down counter 950, and when the selector 930 selects the accumulator 920, the counter control circuit 940 controls the up/down counter 960. In this aspect, as an example, the case in which the accumulator 910 and up/down counter 950 are selected for the first computation processing is explained.

In step S1003, the first data item Dn is read from the memory 150. The read data Dn is input to one of the input terminals of the computation unit 410 via the data bus 160. The stored value T1 of the accumulator 910 is input to the other input terminal of the computation unit 410.

The computation unit 410 executes computation of the sum of the input data items Dn, T1 (see step S1004). This computation is the first real part computation. In the first computation, because the stored value of the accumulator 910 is reset to zero, the output value of the computation unit 410 is the same value as the data Dn read from memory. The stored value T1 of the accumulator 910 is rewritten to the output value of the computation unit 410 (see step S1004).

The computation unit 410 sends the sign bit R-MSB of the computation result to the counter control circuit 940. Also, when overflow occurs in the computation result, the computation unit 410 sends an overflow signal OF to the counter control circuit 940.

The counter control circuit 940 controls the up/down counter 950 according to the values of the signals R-MSB and OF (see step S1005). Details of control by the counter control circuit 940 are similar to the control in the second aspect (see FIG. 6A).

Next, a check is performed to determine whether computations are completed for all data items Dn (see step S1006). If there remains a data item Dn which has not been added, step S1002 and subsequent processing is repeated. In the second processing of step S1002, the selections of the selectors 930, 970 are switched. That is, the accumulator 920 and up/down counter 960 are selected.

Next, the second data item Dn is read from the memory 150 (see step S1003). The read data Dn is input to one input terminal of the computation unit 410 via the data bus 160. The stored value T2 of the accumulator 920 is input to the other input terminal of the computation unit 410.

The computation unit 410 executes computation of the sum of the input data Dn and T2 (see step S1004). This computation is the first imaginary part computation. At this time, the stored value of the accumulator 920 is reset to zero, so that the output value of the computation unit 410 is the same value as the data Dn read from memory. The stored value T2 of the accumulator 920 is rewritten to the output value of the computation unit 410 (see step S804).

The counter control circuit 940 controls the up/down counter 960 according to the values of the signals R-MSB and OF (see step S1005). The details of this control are similar to the control at the time of computation of the real part.

Accumulation of the real part and accumulation of the imaginary part are executed in alternation until, in step S1006, it is judged that computation has been completed for all data items Dn.

When, in step S1006, it is judged that all data items Dn have been added, first the selector 970 selects the count value CNT1 of the up/down counter 950. Because of this, the stored value CNT1 is corrected by the correction circuit 430 (see step S1007). The correction method is similar to the correction of the second aspect (see FIG. 6B). Thereafter, the stored value T1 and the corrected count value CNT1 are, for example, stored in the memory 150 as the real part of the accumulation result (see step S1007).

Next, the selector 970 selects the count value CNT2 of the up/down counter 960. By this means, the count value CNT2 is corrected by the correction circuit 430 (see step S1008). The correction method is similar to the correction of the count value CNT1. Then, the stored value T2 and the corrected count value CNT2 are, for example, stored in the memory 150 as the imaginary part of the accumulation result (see step S1008).

The computation circuit 900 of this aspect comprises two accumulators 910, 920 and two up/down counters 950, 960, and so can execute two kinds of accumulation in parallel at high speed. Consequently, for reasons similar to those for the computation circuit 700 of the third aspect, high-speed processing is possible.

Also, for reasons similar to those for the computation circuit 400 of the second aspect, the dynamic range of the computation circuit 900 of this aspect can be extended without detracting from the accuracy of the computation result.

What is claimed is:

1. A computation circuit having a dynamic range extension function, comprising:
    an accumulator, in which is stored an n-digit computation result;
    a computation unit, which computes the sum of n-digit input data and a stored value from said accumulator, and stores the computation result in said accumulator;
    an m-digit up/down counter, which increases and decreases a count value; and,
    a control circuit, which executes control of the count value of said up/down counter so as to coincide with the value of the upper m digits of the sum of said input data and said stored value.

2. The computation circuit according to claim 1, wherein said control circuit comprises a counter control circuit which, when carry-over occurs in the computation result of said computation unit, increments by one the count value of said up/down counter, and, when said input data is a negative number, decrements by one the count value of said up/down counter.

3. The computation circuit according to claim 2, wherein said counter control circuit controls the counting-up and the counting-down of said up/down counter according to the most significant bit of said input data and a carry signal of said computation unit.

4. The computation circuit according to claim 3, wherein, when said most significant bit of said input data is "0" and said carry signal is "carry-over occurred", said counter control circuit increments by one the count value of said up/down counter, when said most significant bit of said input data is "1" and said carry signal is "carry-over did not occur", said counter control circuit decrements by one the count value of said up/down counter, and in all other cases, said counter control circuit does not change the count value of said up/down counter.

5. The computation circuit according to claim 1, wherein said control circuit comprises:
    a counter control circuit which, when positive overflow occurs in the computation result of said computation unit, increments by one the count value of said up/down counter, and when negative overflow occurs in the computation result of said computation unit, decrements by one the count value of said up/down counter; and,
    a correction circuit which, when the computation result of said computation unit after the completion of computations is a positive number equal to or greater than $2^{n-1}$, and when the computation result of said computation unit after the completion of said computations is a negative number, decrements by one the count value of said up/down counter.

6. The computation circuit according to claim 5, wherein said counter control circuit controls the counting-up and counting-down of said up/down counter according to the most significant bit and overflow signal of said computation unit.

7. The computation circuit according to claim 6, wherein, when the most significant bit of said computation unit is "0" and said overflow signal is "overflow occurred", said counter control circuit increments by one the count value of said up/down counter, when the most significant bit of said computation unit is "1" and said overflow signal is "overflow occurred", said counter control circuit decrements by one the count value of said up/down counter, and in other cases said counter control circuit does not change the count value of said up/down counter.

8. The computation circuit according to claim 5, wherein said correction circuit corrects the count value of said up/down counter according to the most significant bit of the final computation result of said computation unit.

9. The computation circuit according to claim 8, wherein, when the most significant bit of said final computation result is "1", said correction circuit decrements by one the count value of said up/down counter, and when the most significant bit of said final computation result is "0", said correction circuit does not change the count value of said up/down counter.

10. The computation circuit according to claim 1, characterized in that a plurality of said accumulators and a plurality of said up/down counters are provided.

11. The computation circuit according to claim 10, comprising a first selector which selects and provides to said computation unit one of the stored values of said plurality of accumulators.

12. The computation circuit according to claim 11, wherein said computation unit stores the computation result in said accumulator from which was read a stored value used in computations.

13. The computation circuit according to claim 12, wherein said control circuit controls the count value of said up/down counter corresponding to said accumulator from which was read a stored value used in computation.

14. The computation circuit according to claim 10, comprising a second selector which selects and outputs one of the count values of said plurality of up/down counters.

15. The computation circuit according to claim 1, wherein said computation unit performs accumulation of a plurality of input data items.

16. The computation circuit according to claim 1, further comprising an n-digit data bus to provide said input data to said computation unit.

17. The computation circuit according to claim 16, further comprising a memory to provide said input data to said data bus.

18. The computation circuit according to claim 1, wherein, after completion of computations, the count value of said up/down counter and the stored value of said accumulator are stored in said memory.

19. The computation circuit according to claim 1, wherein the stored value of said accumulator is output as the lower n digits of the computation result, and moreover said up/down counter is used to output, as the upper m digits of the computation result, a count value generated by said control circuit.

20. The computation circuit according to claim 1, wherein said input data is data represented by the 2's complement method.

* * * * *